United States Patent [19]
Moed et al.

[11] Patent Number: 6,141,433
[45] Date of Patent: Oct. 31, 2000

[54] SYSTEM AND METHOD FOR SEGMENTING IMAGE REGIONS FROM A SCENE LIKELY TO REPRESENT PARTICULAR OBJECTS IN THE SCENE

[75] Inventors: Michael C. Moed, Roswell; Ralph N. Crabtree, Atlanta, both of Ga.

[73] Assignee: NCR Corporation, Dayton, Ohio

[21] Appl. No.: 08/998,211

[22] Filed: Dec. 24, 1997

Related U.S. Application Data

[60] Provisional application No. 60/050,972, Jun. 19, 1997.

[51] Int. Cl.$^7$ .............................. G06K 9/00; G06K 9/46; H04N 9/47

[52] U.S. Cl. ....................... 382/103; 382/164; 382/236; 348/143

[58] Field of Search ................................ 382/103, 164, 382/165, 236, 257; 348/143, 152, 155, 169, 700, 701, 590, 591, 592

[56] References Cited

U.S. PATENT DOCUMENTS

| | | | |
|---|---|---|---|
| 4,497,065 | 1/1985 | Tisdale et al. | 382/103 |
| 5,034,986 | 7/1991 | Karmann et al. | 382/103 |
| 5,194,941 | 3/1993 | Grimaldi et al. | 348/587 |
| 5,301,239 | 4/1994 | Toyama et al. | 382/104 |
| 5,359,363 | 10/1994 | Kuban et al. | 382/103 |
| 5,677,733 | 10/1997 | Yoshimura et al. | 348/362 |
| 5,896,176 | 4/1999 | Das et al. | 348/416 |
| 5,912,980 | 6/1999 | Hunke | 382/103 |
| 5,914,748 | 6/1999 | Parulski et al. | 348/239 |

OTHER PUBLICATIONS

Pattern Recognition, "A Survey on Image Segmentation", Fu et al., vol. 13, pp. 3–16, 1981.

Pattern Recognition, "A Review on Image Segmentation Techniques", Pal et al., vol. 26, No. 9, pp. 1277–1294, 1993.

Proc. 11$^{th}$ IAPR International Conference on Pattern Recognition, "Color Segmentation Using Perceptual Attributes", Tseng et al., vol. III, pp. 228–231, 1992.

IEEE, "Fusion of Color and Edge Information for Improved Segmentation and Edge Linking", Saber et al., pp. 2176–2179, 1996.

Pattern Recognition, "A segmentation Algorithm for Color Images", Schettini, Letters 14, pp. 499–506, 1993.

IEEE 10$^{th}$ Conf. Pattern Recognition, "Color Segmentation by Hierarchical Connected Components Analysis with Image Enhancement by Symmetric Neighborhood Filters", pp. 796–802, 1990.

*Primary Examiner*—Amelia Au
*Assistant Examiner*—Mehrdad Dastouri
*Attorney, Agent, or Firm*—Needle & Rosenberg

[57] ABSTRACT

A system and method for extracting image information from a video frame for regions of a the video frame that likely are objects of interest in a scene. An initial region set is generated by comparing luminance image information and color image information of a video frame with luminance image information and color image information of a background image for the scene. A high confidence region set is generated comprising regions from the initial based upon edge information of the regions and edge information in the background image. A final region set is generated by combining one or more regions in the high confidence region set if such combinations satisfy predetermined criteria, including size, region proximity and morphological region dilation.

38 Claims, 9 Drawing Sheets

SYSTEM AND METHOD FOR SEGMENTING IMAGE REGIONS FROM A SCENE LIKELY TO REPRESENT PARTICULAR OBJECTS IN THE SCENE

This application claims the benefit of U.S. Provisional Application Ser. No. 60/050,972 filed Jun. 19, 1997.

BACKGROUND OF THE INVENTION

1. Field of the Invention

The present invention generally relates to video tracking systems, and more particularly, to a system and method for extracting regions of a video frame for a scene that likely represent particular types objects, such as people.

2. Description of the Prior Art

In video identification or tracking systems, it is necessary to isolate and/or extract those portions of a video frame image that represent items or objects of interest. Many prior art systems utilize complex model information representing features of the objects to be identified and/or tracked. However, using such complex comparison schemes at an early stage of a identification or tracking process does not yield optimal results.

SUMMARY OF THE INVENTION

Briefly, the present invention is directed to a system and method for extracting regions from a video frame that represent objects of interest with respect to a background image for the scene. A first set of regions, called an initial region set, is generated based upon differences between luminance information for the video frame and luminance information for a background image of the scene. A second set of regions, called a high confidence region set, is generated from the first set of regions based upon edge information for regions in the first set and edge information for the background image. A third set of regions, called the final region set, is generated from the second set of regions by combining regions in the second set with each other if resulting combined regions satisfy predetermined criteria, including size, proximity and other features.

The objects and advantages of the present invention will become more readily apparent when reference is made to the following description taken in conjunction with the accompanying drawings.

DETAILED DESCRIPTION OF THE INVENTION

Figure 1:
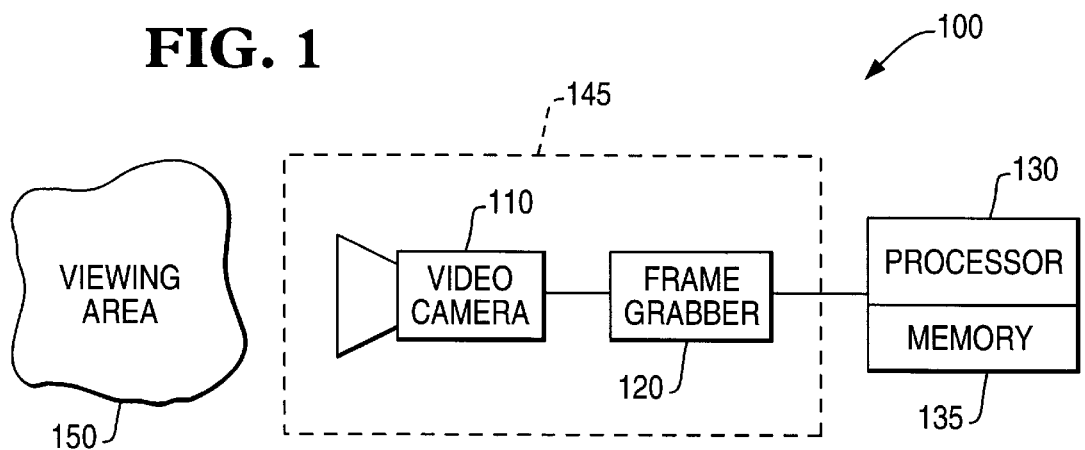
FIG. 1 is a block diagram showing the basic hardware components of the image region segmentation system according to the present invention.

FIG. 1 illustrates the hardware components of a system which performs region segmentation according to the present invention. The hardware components are standard off-the-shelf components, and include one or more video cameras 110, one or more frame grabbers 120, and a processor 130, such as a personal computer (PC), having a memory 135 which stores software programs for controlling the processor 130. The combination of the video camera 110 and frame grabber 120 may collectively be referred to as an "image acquisition module" 145. The frame grabber 120 receives a standard video signal output by the video camera 110, such as a RS-170, NTSC, CCIR, or PAL video signal, which can be monochrome or color. In a preferred embodiment, the video camera(s) 110 are mounted or positioned to view a selected viewing area or scene 150 of interest, such as a checkout lane in a retail establishment, an automated teller machine (ATM), an entrance, an exit, or any other localized area where people may move and/or interact with devices or other people.

The frame grabber 120 is embodied, for example, by a Meteor™ Color Frame Grabber, available from Matrox. The frame grabber 120 operates to convert the analog video signal into a sequence or stream of digital video frame images that are stored within the memory 135, and processed by the processor 130. For example, in one implementation, the frame grabber 120 converts the video signal into a 2×2 sub-sampled NTSC image which is 320× 240 pixels (whereas the normal NTSC image is 640×480) or a 2×2 sub-sampled PAL color image which is 384×288 pixels (whereas the normal PAL image is 768×576), or in general a W×L image defining a single video frame of video information. A variety of other digital image formats and resolutions are also suitable, as will be recognized by one of ordinary skill in the art. Each pixel of a video frame has a predetermined bit resolution, such as 8 bits, and color data may be used to increase system performance.

The region segmentation finctionality is preferably implemented by way of a software program that may be installed in the memory 135 from another memory/storage medium, such as a CD-ROM, floppy disk(s), hard disk, etc., or it may be downloaded from an internet site, or from an on-line service for installation into the memory 135. The image segmentation program comprises a plurality of executable instructions which, when stored in the memory 135, cause the processor 130 to perform the processes depicted in FIGS. 3–7. However, one with ordinary skill in the art will appreciate that the region segmentation functionality could be implemented by one or more application specific integrated circuits, a digital signal processor or other suitable signal processing architectures.

Figure 2:
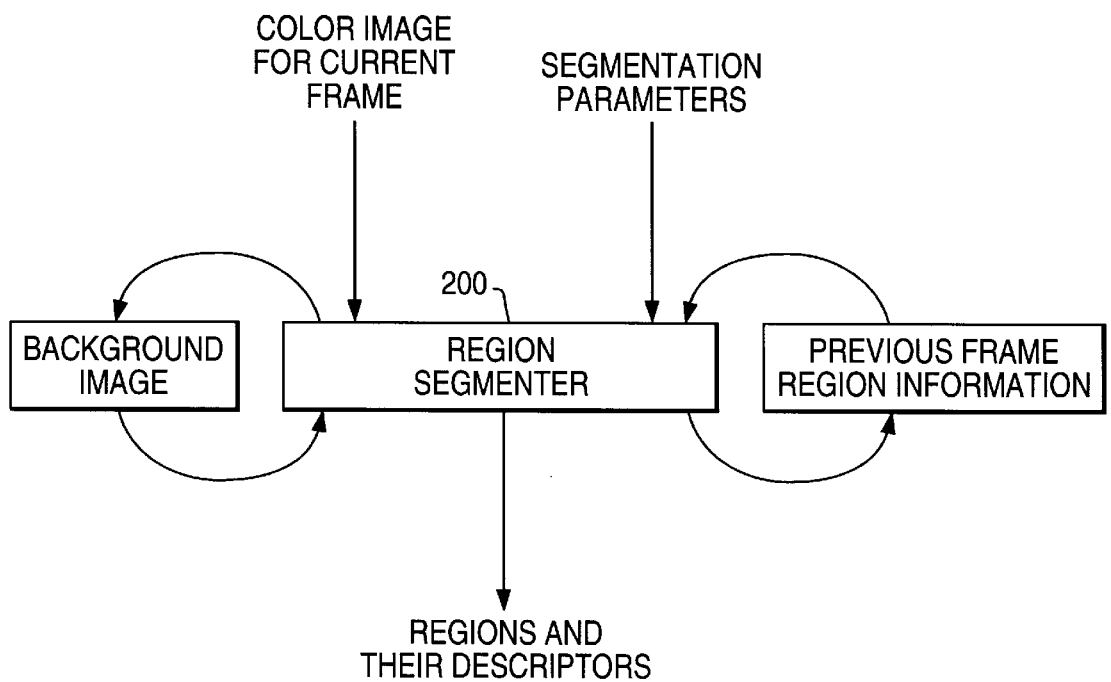
FIG. 2 is a diagram showing how the region segmentation process interfaces with other information in a tracking system.

The region segmentation process is represented by the region segmenter shown at reference numeral 200 in FIG. 2. The region segmenter 200 utilizes color image information to extract the regions of interest. The inputs to the region segmenter are image information for the current video frame, predetermined and adjustable segmentation parameters (such as thresholds, etc.), and image information for a background image. The output of the region segmenter 200 is a set of regions and their descriptors (described in more detail hereinafter). The background image is generated by one of many processes known in the art, and represents the current or updated background image for the scene.

The region segmentation process described hereinafter is tailored to extract regions from an image that are likely to represent to people within the scene. However, one with ordinary skill in the art will appreciate that the region segmentation process can be tailored to extract regions that represent other objects within a scene, such as vehicles, particular classes of people, etc.

To extract regions potentially representing people within the scene, the region segmentation process is based on several basic ideas in order to segment regions that represent people. First, people moving through a scene tend to have different color attributes that the background image for the scene. In areas where the background image is dark, it is more difficult to detect these color differences than where the background image is light. Second, people tend to create new edges in the scene, and to obscure edges in the background image. Third, shadows and highlights are largely due to intensity changes in the gray component of a color image, and therefore, do not create significant color differences, nor do they obscure edges in the background image. Finally, regions that are preliminarily determined to represent a person that share a large, common perimeter, belong to the same person.

Figure 3:
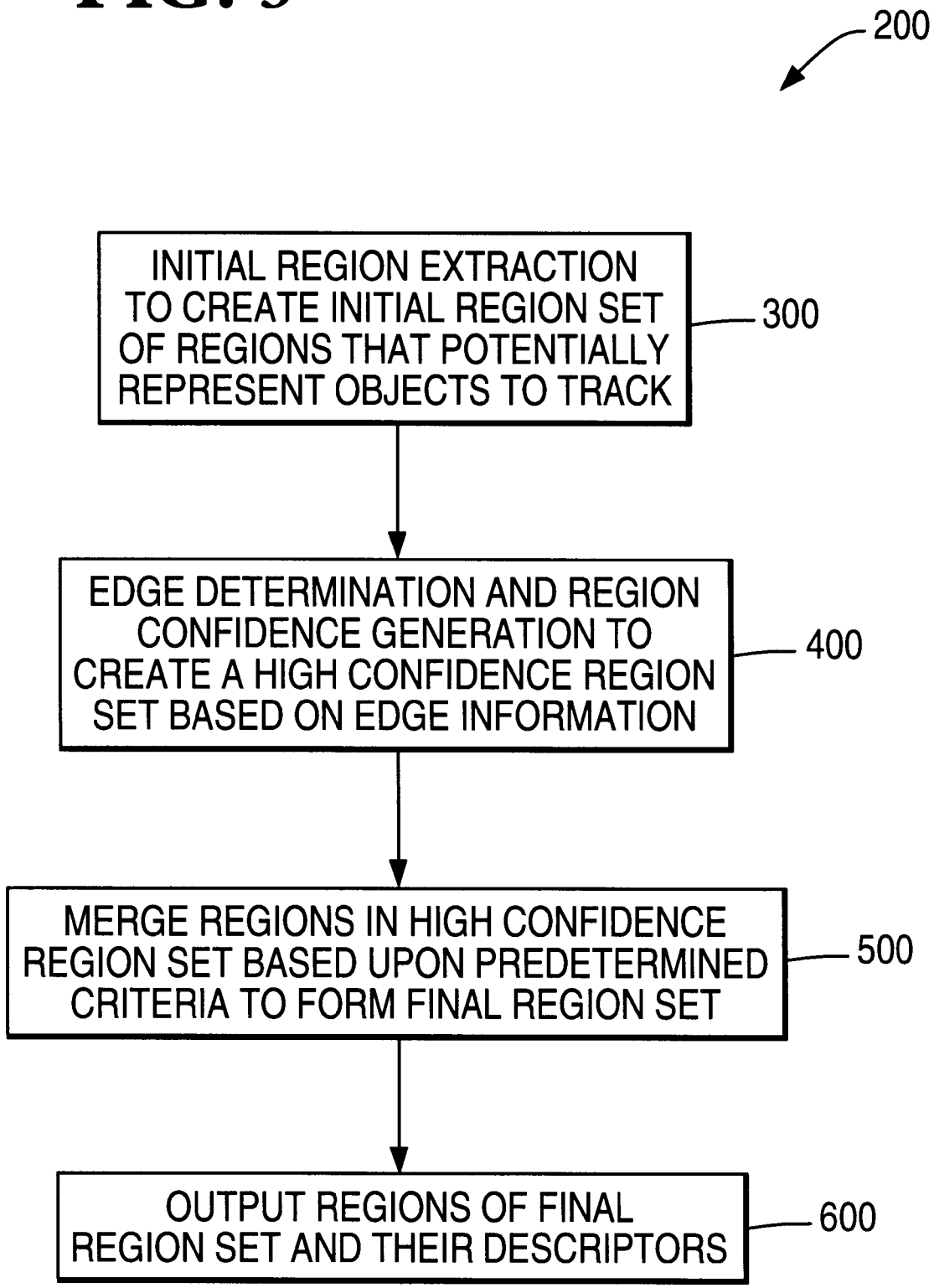
FIG. 3 is a flow chart generally showing the region segmentation process according to the present invention.

Turning to FIG. 3, the overall architecture of the region segmentation process is described. The region segmentation process comprises three processing portions: an initial region extraction process 300; an edge determination and region confidence generation process 400; and a region merge and final region determination process 500. After final region determination, the regions and their descriptors are output in step 600.

The initial region extraction process 300 involves generating a first set of regions called an initial region set, by comparing image information with image information of a background image for the scene. The output of the initial region extraction process 300 is an initial region set comprising one or more regions that preliminarily or potentially represent an object (such as a person) in the scene. As will explained hereinafter, the initial region set can be generated from both luminance and color image information, from luminance information only (such as for non-color video signals) and from color information only.

The edge determination and region confidence generation process 400 compares edge information for the regions in the initial region set with edge information of the background image to generate a second set of regions called a high confidence region. Those regions from the initial region set which have edge information that does not correspond to edge information in the background image tend to be retained in the high confidence region set, as do those regions that obscure edges in the background image.

The region merge and final region determination process 500 combines one or more regions in the high confidence region set if the resulting combined regions satisfy predetermined criteria. The combined regions make up a third set of regions called the final region set. The location information and image information for the regions in the final region set are output in step 600.

Thus, in brief summary, the region segmentation process involves steps of:

(a) generating a first set of regions based upon differences between image information for the video frame and image information for a background image of the scene;

(b) generating a second set of regions from the first set of regions based upon edge information for regions in the first set and edge information for the background image; and (c) generating a third set of regions from the second set of regions by combining regions in the second set with each other if resulting combined regions satisfy predetermined criteria.

Figure 4:
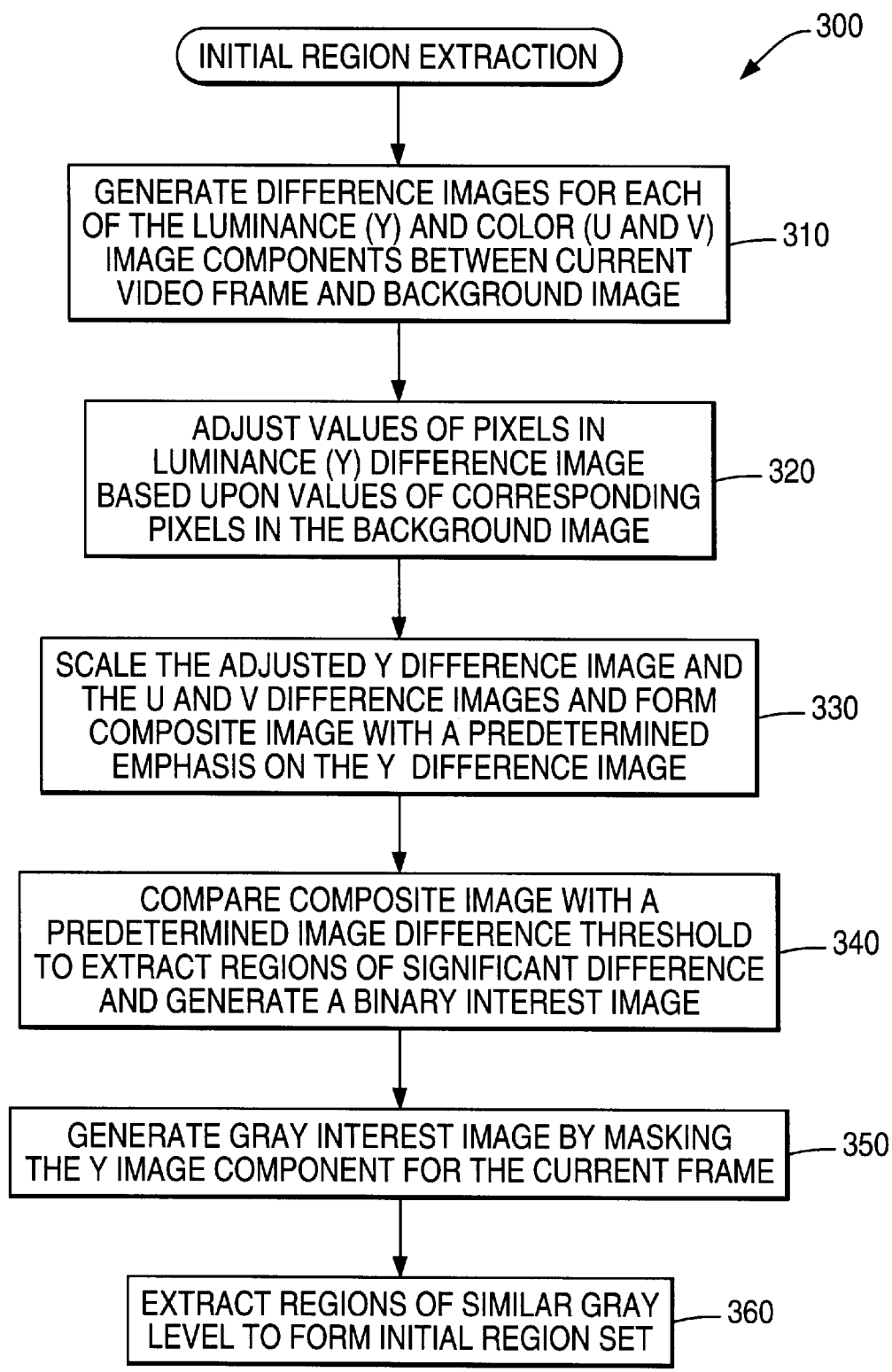
FIG. 4 is a flow chart showing the initial region extraction portion of the region segmentation process.

Referring to FIG. 4, the initial region extraction process 300 will be described. The following description is directed to a preferred embodiment in which the luminance and color image information portions of a color video signal are analyzed. For example, if the PAL color coding system is used, then the luminance image information is the Y component of a YUV image and the color image information consists of the U component and the V component of the YUV image. Other color coding systems are also suitable for use in the region segmentation process.

Figure 8:
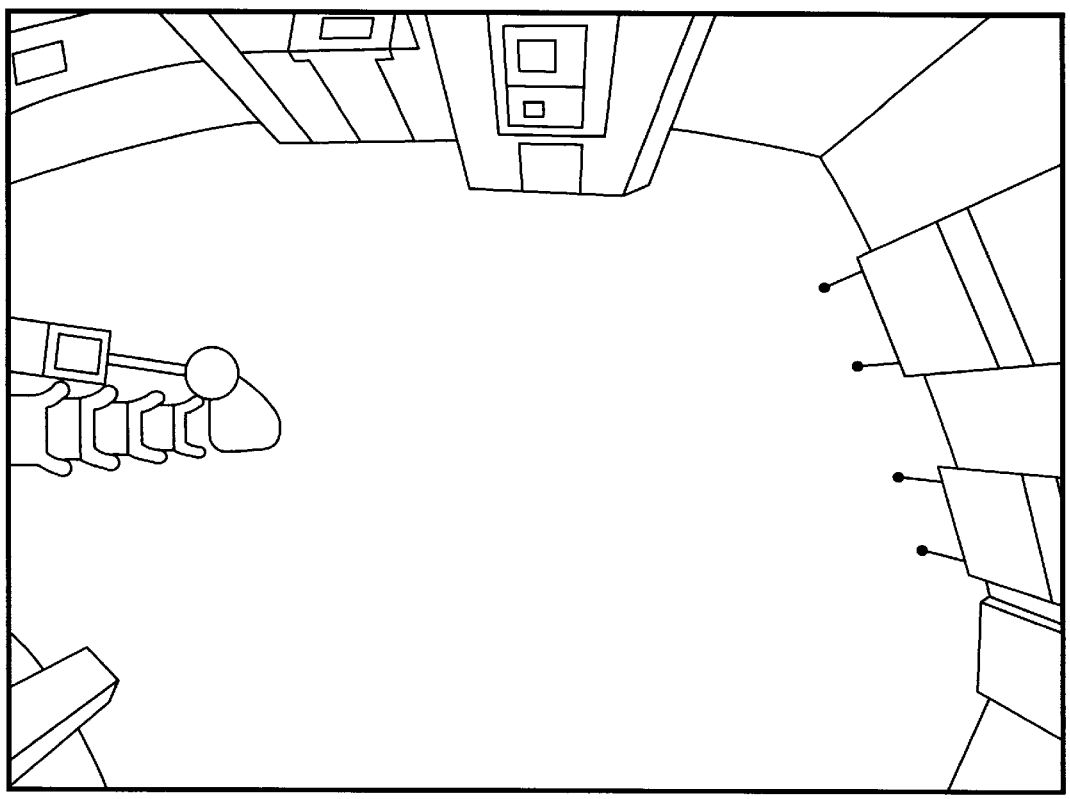
FIG. 8 is a pictorial diagram showing a background image.
Figure 9:
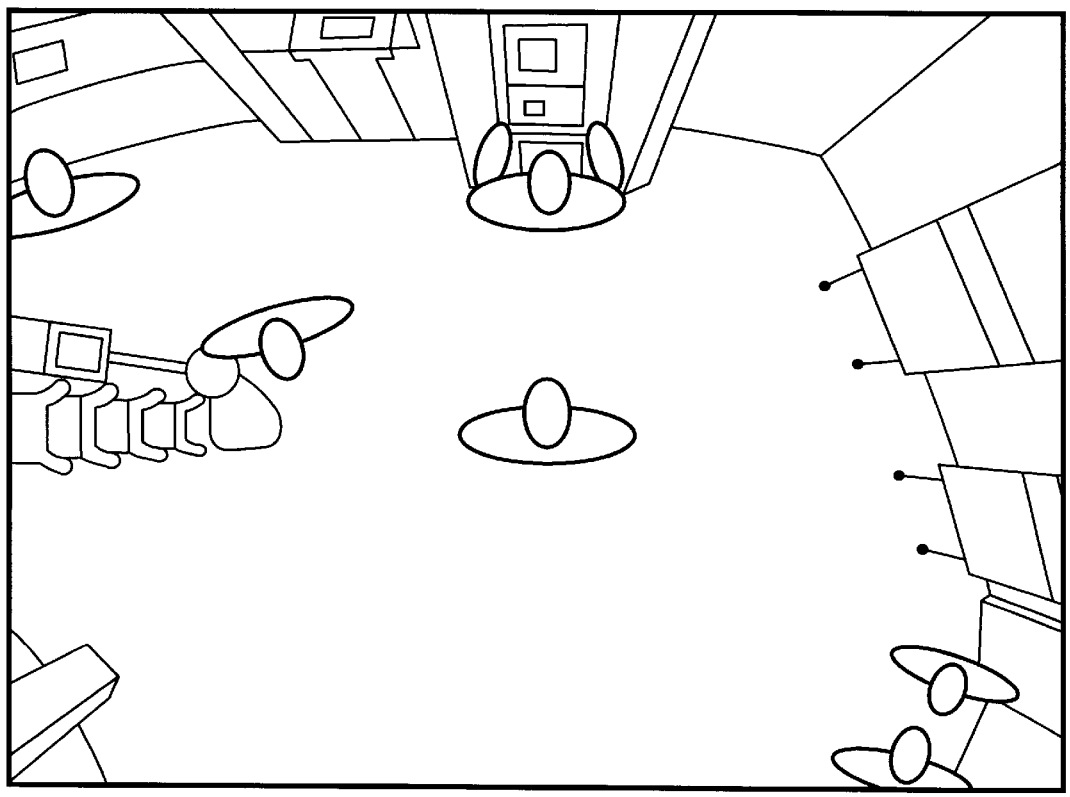
FIG. 9 is a pictorial diagram showing image for a video frame.

In step 310, difference images are generated for both the luminance image and the color difference image, between the video frame and the background image. An example of a background image is shown in FIG. 8 and an example of a image for a video frame is shown in FIG. 9. The view of the scene is from video camera mounted above the scene being monitored. FIG. 9 shows an image for a video frame in which there are objects 601, 602, 603, 604 and 605, such as people, to be detected and tracked.

In step 310, three difference images are generated, a Y difference image, U difference image and V difference image. The difference image for each signal component is generated by computing the absolute value of the difference, or distance, between pixels in the video frame and corresponding pixels in the background image. Specifically, for each of the Y, U and V component images (also known as bands), the value of each pixel in the background image is subtracted from the value of the corresponding pixel for the component image. The absolute value of the result of the subtraction of the pixel values is stored at the corresponding location in the difference image for that component image.

Next, in step 320, the Y difference image is adjusted based upon values of corresponding pixels in the background image. Specifically, each pixel in the Y difference image is multiplied by a factor which is proportional to a luminance intensity of the corresponding pixel in the background image. The factor is greater than or equal to 1. In particular, the factor is greater than 1 when the corresponding pixel in the background image is dark with respect to a threshold and is equal to 1 when the corresponding pixel in the background image is light with respect to a threshold. The new Y difference image is called an adjusted Y difference image. The Y difference image is adjusted in this way to accentuate small luminance differences in a dark background image. This helps to locate objects in the video frame that are only slightly darker than the background environment. This step is not necessary and it there may be circumstances in which it is not required.

In step 330, a composite image is formed. The adjusted Y difference image and the U and V difference images are scaled to equalize their respective pixel range values. The U and V difference images tend to have a compressed range of pixel values, e.g., the gray values only range from 100–156, instead of 0–255 (the full range). Therefore, small differences in the gray values of the U and V images for the video frame and the U and V images for the background image are equally as important as large differences in the gray value in the Y image component for the video frame and the background image (which tends to contain a much broader range of gray values). Also, there may be some range differences between the U and V images. To accentuate the small differences in the U and V image components with respect to the Y image components, several steps are performed.

First, the range of gray values for the U and V difference images is examined. The difference image with the smaller range of values is scaled to the same range as the difference image with the larger range. Scaling is performed by multiplying each pixel value of the first image by an appropriate constant that yields a resulting scaled image with approximately the same range as the other difference image. This scaled difference image and the non-scaled difference image are combined to form a combined UV difference image by either taking the maximum value of each pixel for the two difference images, or by summing each pixel in the two images. There are other ways to combine the two difference images as is well known in the art.

Next, the range of gray values for the Y difference image and the combined UV difference image is examined. Again, the difference image with the smaller range of values, usually the combined UV difference image, is scaled to the same range as the difference image with the larger range of values by multiplying each pixel in the difference image with the smaller range by an appropriate constant. The appropriate scaled and non-scaled versions of the Y difference image and the combined UV difference image are combined to form a composite image.

The adjusted Y difference image is given a weight in the composite image based upon a predetermined emphasis factor. The predetermined emphasis factor is one of the adjustable segmentation parameters and it is used to control the emphasis of either the color differences or intensity differences between the video frame and the background image in the segmentation process. A greater weight is given to the adjusted Y difference image to emphasize intensity differences in the composite image, and a lesser weight is given to emphasize color differences in the composite image. Thus, appropriate scaled and non-scaled versions of a weighted adjusted Y difference image is combined with the combined UV difference image. The combined image is formed by taking the pixel-by-pixel maximum of the two images, or by taking the sum of the two images, or by some other suitable means well known in the art.

Controlling the emphasis factor allows for compensation for variable scene conditions. Scenes that are shadowy or that are subject to glare generally experience these effects mostly in the luminance band of the image. For these scenes it may be appropriate to give the Y difference image a smaller weight and accentuate the color difference images. Typical weight values for this case may be 0.4 for the Y difference image, and 0.6 for the color difference images. On the other hand for dark scenes that have little lighting, color differences may be the result of scene noise, so it is appropriate to more highly weight the Y difference image than the color differences images. Typical weight values for this case may be 0.8 for the Y difference image, and 0.2 for the color difference images.

Figure 10:
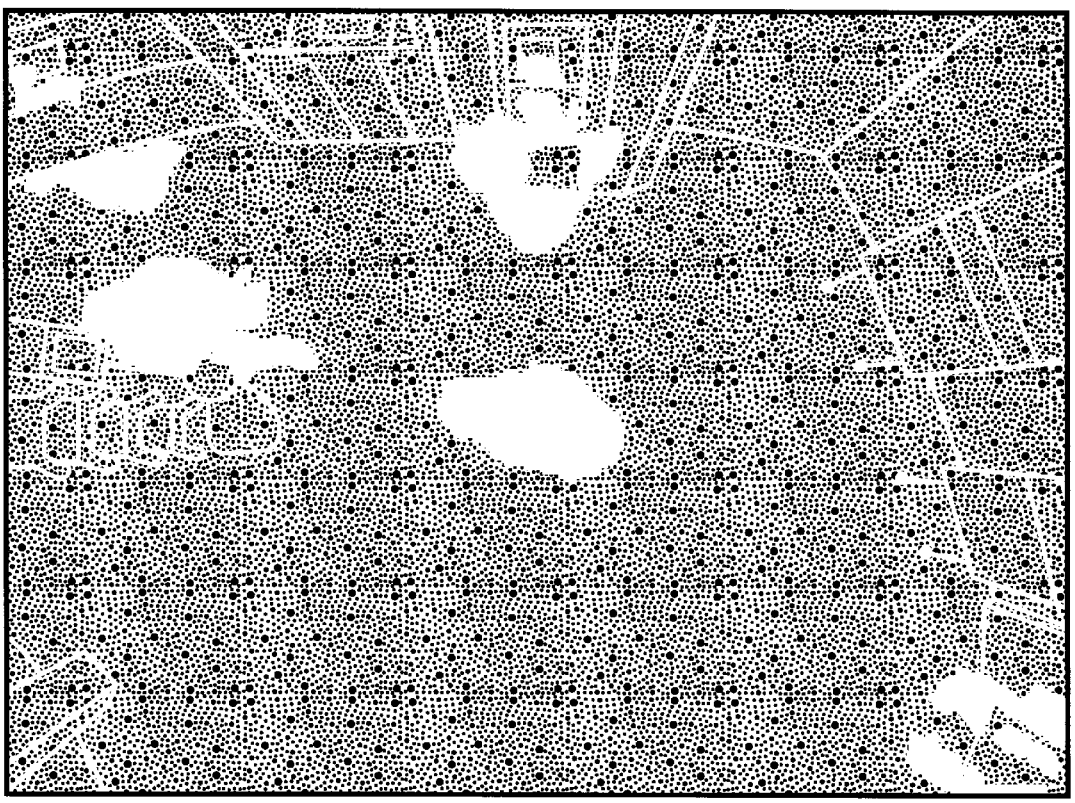
FIG. 10 is a pictorial diagram showing a binary interest image generated by the region segmentation process of the present invention for the images shown in FIGS. 8 and 9.

In step 340, the composite image is compared, pixel by pixel, with a predetermined image difference threshold. If the pixel has a value greater than the threshold, the corresponding pixel in the binary interest image is set to "TRUE". Otherwise, the corresponding pixel is set to "FALSE". Therefore, those regions in the composite image that are greater than the predetermined image difference threshold are regions of significant image difference, and make up an image called the binary interest image. FIG. 10 illustrates the binary interest image corresponding to the image information for the background image of FIG. 8 and the video frame of FIG. 9.

In step 350, a gray interest image is generated by masking the luminance image information, the Y component image, of the video frame with the binary interest image. The gray interest image includes gray scale areas of interest.

The masking process operates as follows. The binary interest image contains pixels of two values, TRUE and FALSE. If a given pixel in the binary interest image is labeled TRUE, the gray value at the same (x,y) location in the luminance image is copied to the same location in the gray interest image. If a given pixel in the binary interest images is labeled FALSE, a value indicating "no interest" is written to the corresponding location in the gray interest image. Pixels in the gray interest image that are assigned the "no interest" value are not considered for further processing.

Figure 11:
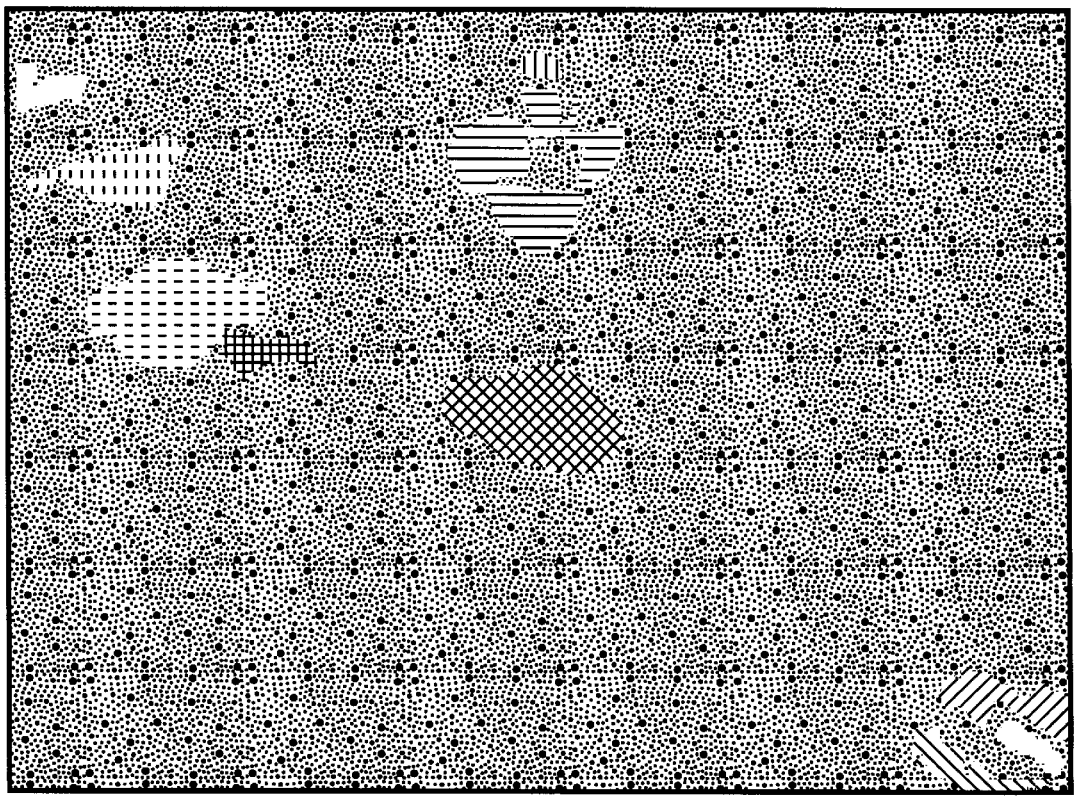
FIG. 11 is a pictorial diagram of regions in an initial region set for the image information of the video frame shown in FIG. 9.

Finally, in step 360, the initial region set is created by extracting from the gray interest image those regions that are connected and have a similar gray level. This is accomplished with a gray level connected component extraction process. There are many such processes known in the art. Small gray level regions are filtered out, and not considered as part of the initial region set. FIG. 11 shows an example of the initial region set for the image information of the video frame shown in FIG. 9.

The region segmentation process according to the present invention is described as being performed on luminance and color image information for a video frame and a background image. It is envisioned, however, that the initial region set is generated based solely on luminance image information or based solely on color image information. If initial region extraction is performed based on luminance image information only, then the segmentation process is suitable for use on non-color video signals, though it may be performed on the luminance image component of a color video signal.

In the case where the first set of regions is generated based only on luminance image information, the initial region extraction procedure is slightly different than that described above. A luminance difference image is generated based upon the luminance image information for the video frame and the luminance image information for the background image. Next, the values of the pixels of the luminance difference image are adjusted based upon corresponding values of pixels in the background image to generate an adjusted luminance difference image. Again, this adjustment step is optional. The adjusted (or non-adjusted) luminance difference image is then compared with a predetermined image difference threshold to generate a binary interest image. The gray interest image is generated by masking the luminance image information of the video frame with the binary interest image. Finally, regions that are connected and have similar gray levels are extracted from the gray interest image to form the first set of regions.

In the case where initial region extraction is performed on color image information only, the procedure involves generating a color difference image based upon image information for the video frame and image information for the background image. The color difference image is compared with a predetermined image difference threshold to generate a binary interest image. A gray interest image is generated by masking color image information of the video frame with the binary interest image. Those regions in the gray interest image that are connected and have similar gray levels are extracted and form the first set of regions.

Figure 5:
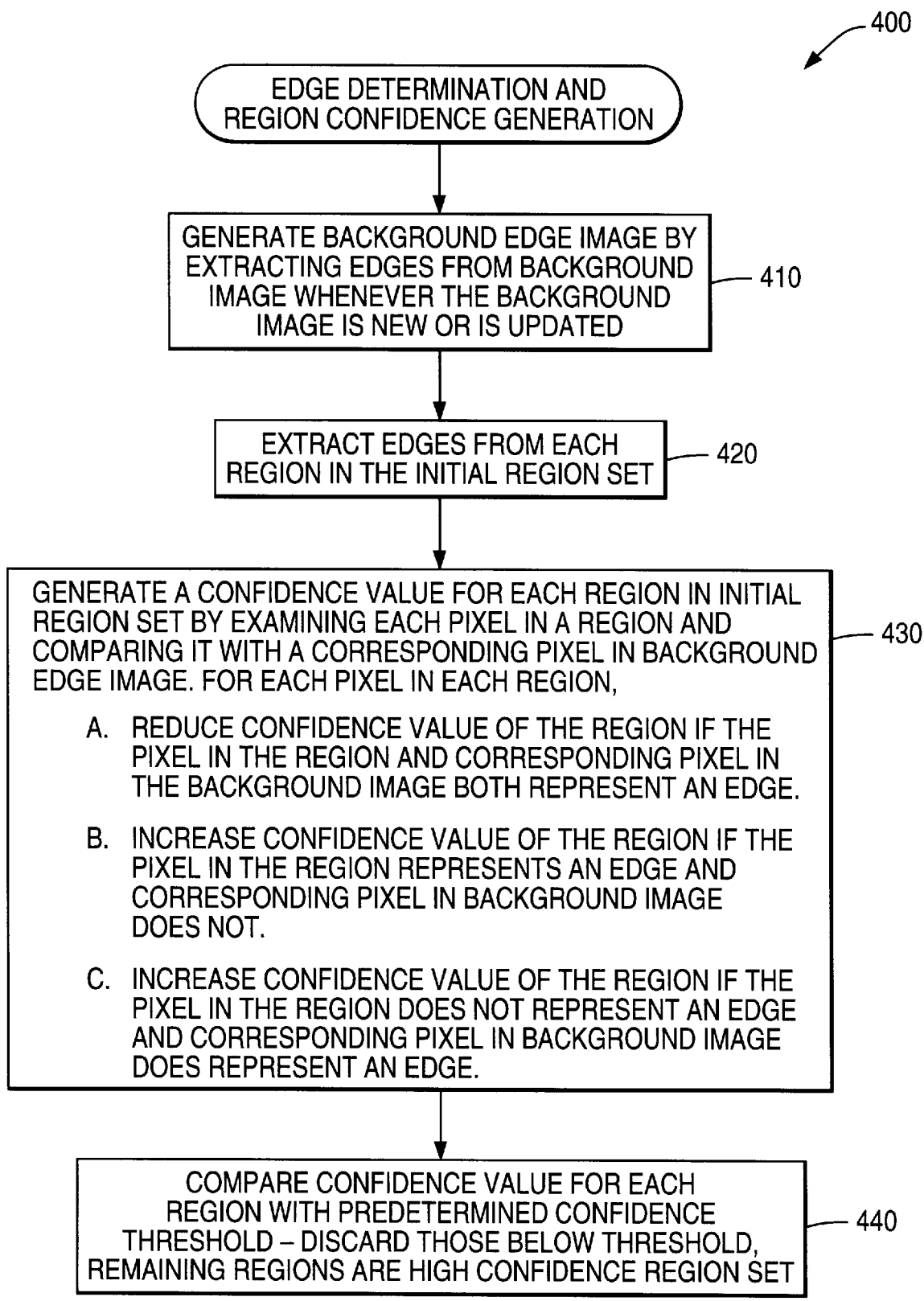
FIG. 5 is a flow chart showing the edge determining and region confidence generation portion of the region segmentation process.
Figure 12:
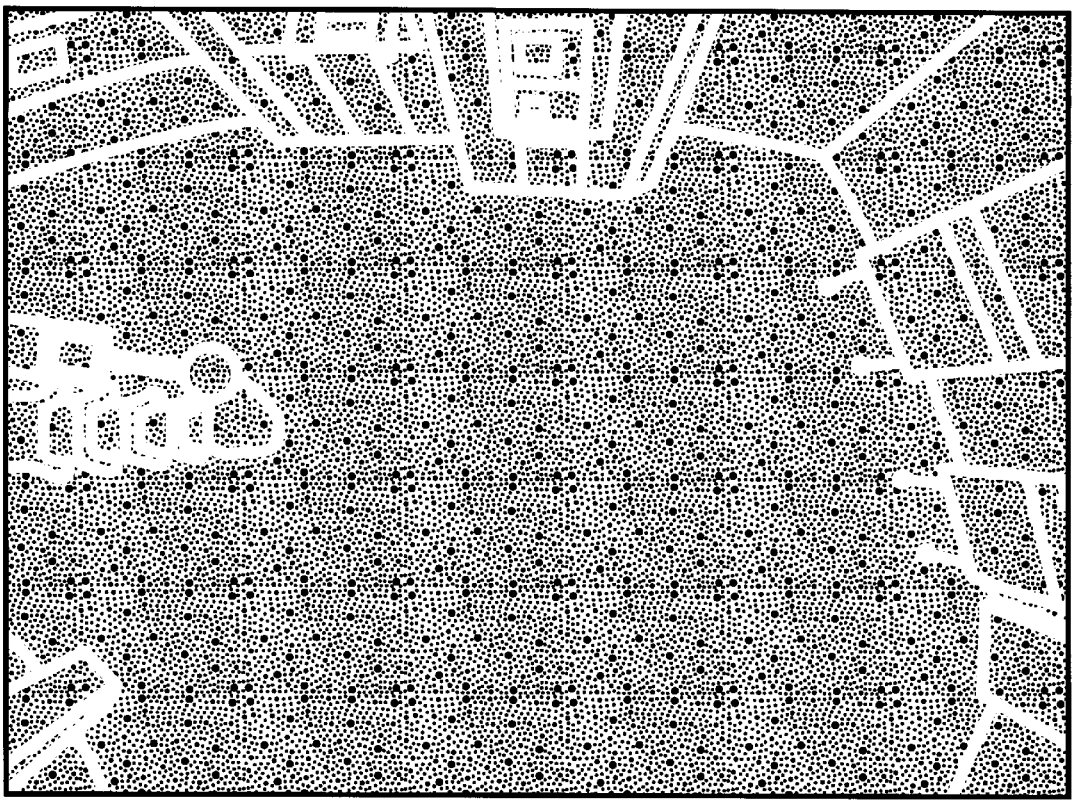
FIG. 12 is a pictorial diagram of a background edge image for the background image shown in FIG. 8.

Turning now to FIG. 5, the edge determination and region confidence generation process will be described. In step 410, the background edge image is generated by extracting edges (edge information) from the background image. There are many ways well known in the art to extract edges from an image, such as the well known Sobel process and the Roberts process. This step is performed whenever the background image is new, or when any part of the background image is updated. Weak edges, those less than a predetermined edge threshold, are discarded. FIG. 12 illustrates an example of a background edge image for the background image shown in FIG. 8.

In step 420, edge information is extracted from each region in the first set of regions. This occurs by extracting edge information from those areas of the gray interest image corresponding to the regions in the first set. Weak edges are discarded from the resulting edge image.

Next, in step 430, a confidence value is generated for each region in the first set of regions by examining each pixel in the edge image for a region and comparing it with a corresponding pixel in the background edge image. The confidence value is dependent on whether the pixels of a region and corresponding pixels in the background image represent edge information.

The confidence value is adduced as each pixel of a region is examined. Specifically, the confidence value of the region is reduced when a pixel in the region and a corresponding pixel in the background image both represent an edge. The confidence value is increased for the region when a pixel in the region represents an edge and corresponding pixel in the background image does not represent an edge, or when the pixel of the region does not represent an edge and a corresponding pixel in the background image does represent an edge. If neither the pixel for a region in the initial region set nor the corresponding pixel in the background image represents an edge, the confidence is not changed. The confidence value for each region is accumulated based on the pixel-by-pixel comparison with the background edge image.

In step 440, the confidence value for each region is compared with a predetermined confidence threshold. Regions having a confidence value less than a threshold are discarded. The regions that have a confidence value greater than the predetermined threshold are retained and make up the second set of regions.

Figure 6:
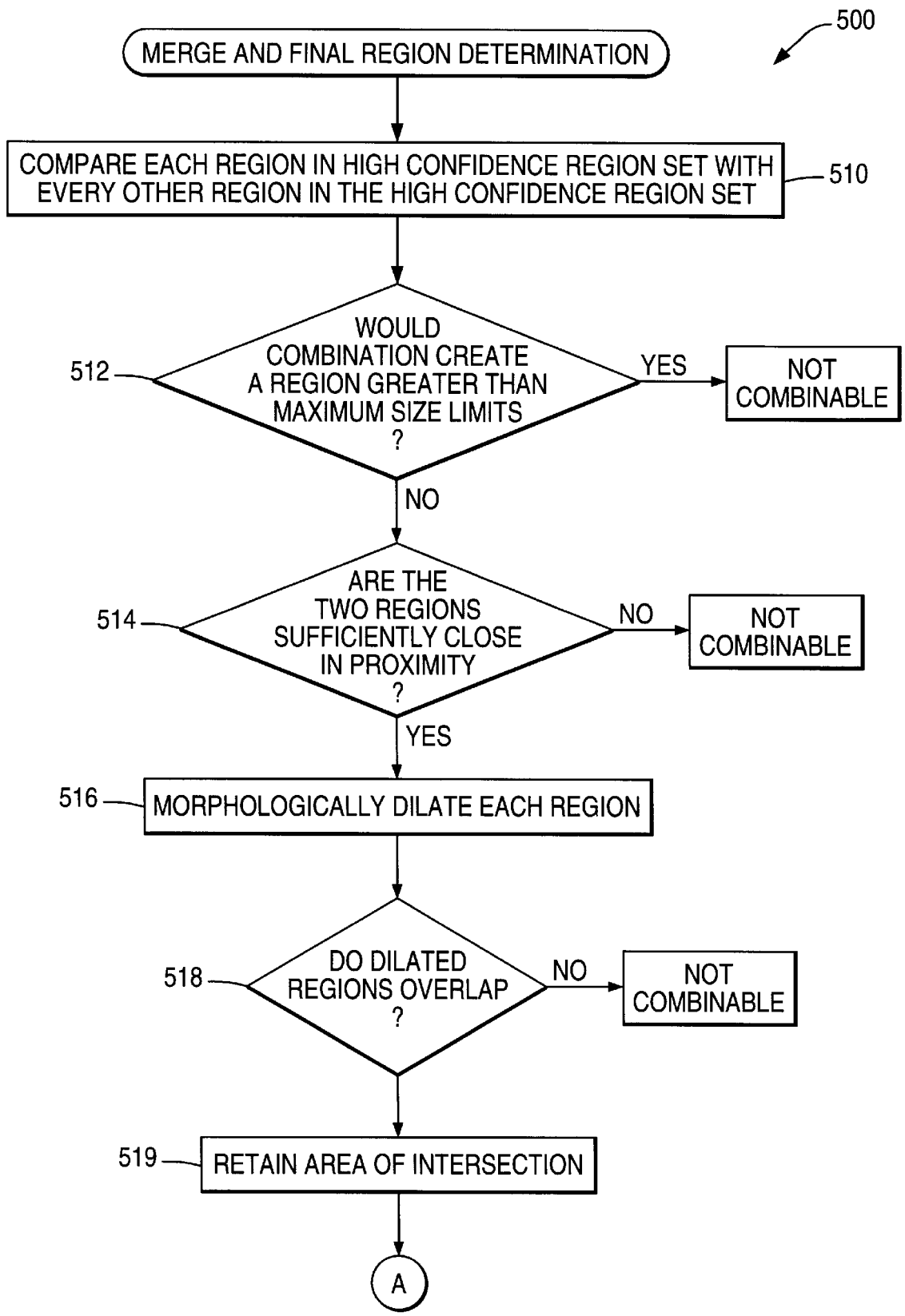
FIGS. 6 and 7 show a flow chart for the merge and final region determination portion of the region segmentation process.
Figure 7:
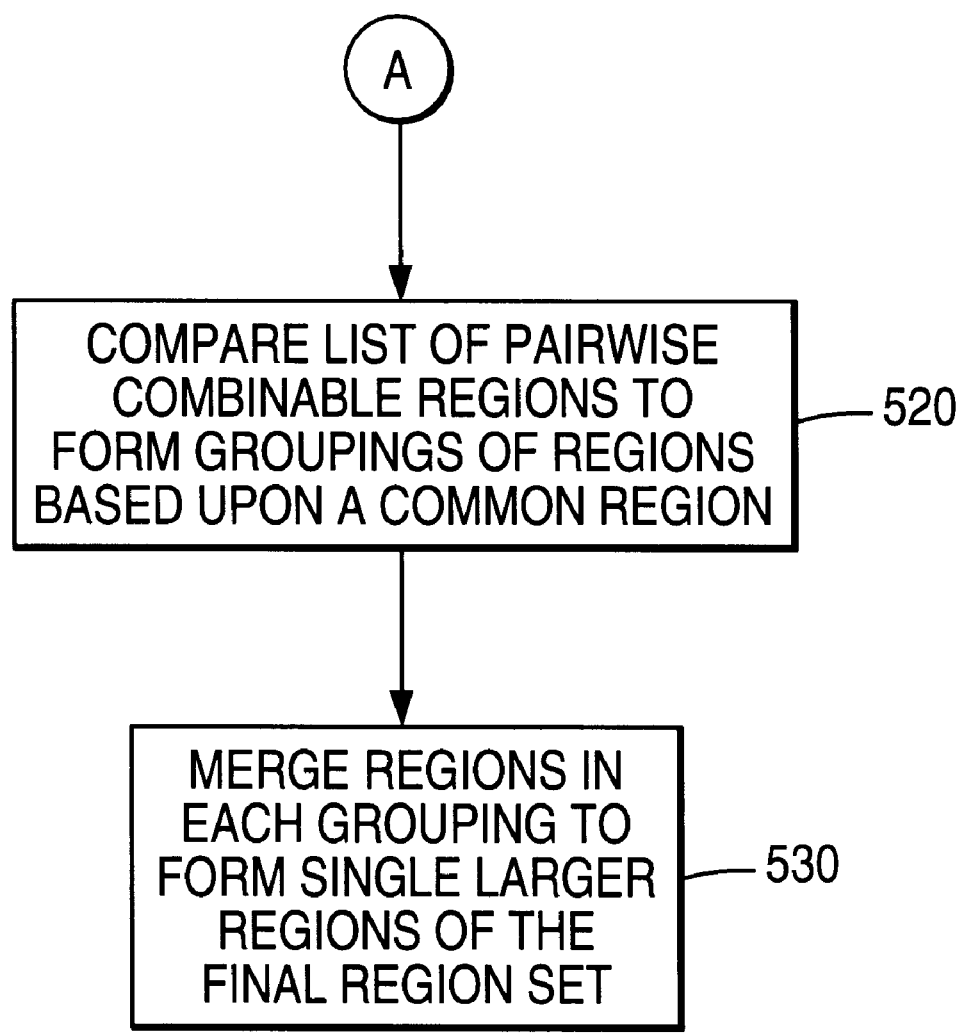

Turning to FIGS. 6 and 7, the merge and final region determination process 500 will be described. In step 510, each region in the second set of regions, the high confidence region set, is compared with every other region in the high confidence region set. A series of tests are applied to each possible combination.

In step 512, it is first determined whether the combination of the two regions would create a region that is larger than predetermined maximum size limits. For example, the height or width of the combined region is compared with a predetermined maximum. If the predetermined maximum is exceeded, then it is determined that the two regions cannot be combined and no further comparison is made between those two regions.

If the test is step 512 is passed, then in step 514, it is determined whether the two regions are sufficiently close in proximity to each other. If they are not sufficiently close together, then they cannot be combined or merged together. No further comparison is made between the two regions.

If the test in step 514 is passed, then in step 516, the two regions are morphologically dilated. Morphological dilation is an image processing technique well known in the art in which an image region is expanded using a geometrical structuring element region which is added to the image region to form a dilated region. For example, the geometrical structuring element region is a 3 pixel by 3 pixel square. The dilation process thickens the image regions by an amount dependent on the geometrical structuring element region. In step 518, it is determined whether the dilated regions overlap. If they do not overlap, then they cannot be combined. If they do overlap, then the area of intersection between the two dilated regions is examined. If the area of intersection is sufficiently large, by comparing it to a predetermined threshold, the regions can be combined, and the area of intersection is retained in step 519. The tests in steps 512–518 can be altered or configured so that at least one of them is made in order to determine whether two regions are combinable.

Next, in step 520, the list of combinable region pairs is compared to form groupings of regions from region pairs that have a common region. For example, if one region pair comprises regions A and B, and another region pair comprises regions B and C, then the grouping of regions A, B and C is formed. B is the common region between the two region pairs. The entire list of region pairs is compared and all of the possible groupings are made. Groupings that would yield regions that are greater than the maximum size are prevented from occurring.

Figure 13:
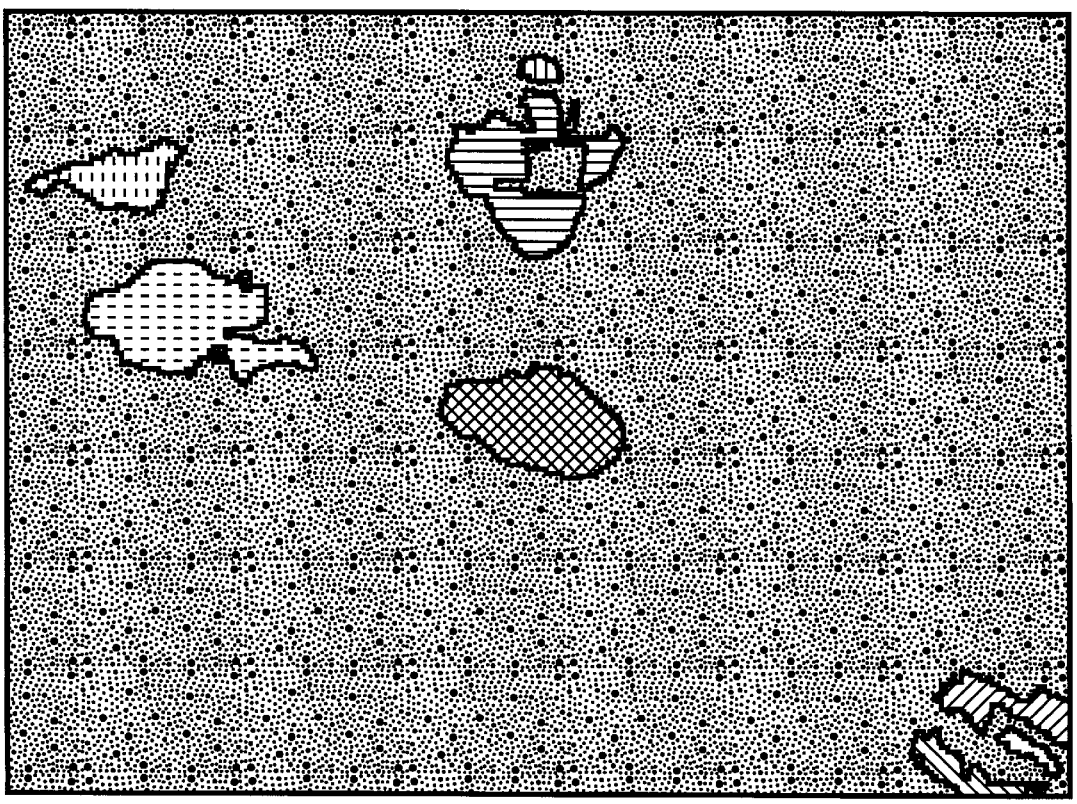
FIG. 13 is a pictorial diagram of regions extracted from the image information for the video frame shown in FIG. 9, and forming the final region set.

Next, in step 530, the grouping of regions are merged together to form single, larger regions. These merged regions are the regions of the final region set. FIG. 13 illustrates the final region set for regions extracted from the video frame shown in FIG. 9 with respect to the background image shown in FIG. 8.

The above description is intended by way of example only and is not intended to limit the present invention in any way except as set forth in the following claims.

What is claimed is:

1. A method for extracting image information from a video frame for regions of the video frame that likely are objects of interest in a scene, comprising steps of:.
   (a) generating a first set of regions based upon differences between image information for the video frame and image information for a background image of the scene;
   (b) generating a second set of regions from the first set of regions based upon edge information for regions in the first set and edge information for the background image, wherein the step of generating a second set of regions comprises steps of:
      (b)(1) extracting edge information from each region in the first set of regions;
      (b)(2) extracting edge information for the background image;
      (b)(3) comparing edge information for each region of the first set of regions with edge information for the background image;
      (b)(4) generating a confidence value for each region in the first set of regions depending on whether pixels of a region and corresponding pixels in the background image represent edge information, wherein the step of generating a confidence value for each region in the first set of regions comprises steps of:
         examining each pixel of a region;

if the pixel in the region represents an edge and a corresponding pixel in the background image represents an edge, then reducing the confidence value for the region;

if the pixel in the region does not represent an edge and a corresponding pixel in the background image represents an edge, then increasing the confidence value for the region; and if the pixel in the region represents an edge and a corresponding pixel in the background image does not represent an edge, then increasing the confidence value for the region;

(b)(5) retaining regions from the first set of regions which have a confidence value greater than a predetermined confidence threshold; and (c) generating a third set of regions from the second set of regions by combining regions in the second set with each other if resulting combined regions satisfy predetermined criteria.

2. The method of claim 1, wherein the step of generating the first set of regions comprises steps of:

(a)(1) generating a luminance difference image and a color difference image based upon image information for the video frame and image information for the background image;

(a)(2) forming a composite image from the luminance difference image and the color difference image;

(a)(3) comparing the composite image with a predetermined image difference threshold to generate a binary interest image;

(a)(4) generating a gray interest image by masking the luminance image information for the video frame with the binary interest image; and (a)(5) extracting from the gray interest image those regions that are connected and have similar gray levels.

3. The method of claim 2, and further comprising the step of:

(a)(6) adjusting values of pixels in the luminance difference image based upon values of corresponding pixels in the background image to generate an adjusted luminance difference image;

wherein the composite image is formed based on the adjusted luminance difference image and the color difference image.

4. The method of claim 3, wherein the step of adjusting values of pixels in the luminance difference image comprises multiplying a value of each pixel in the luminance difference image by a factor which is proportional to a luminance intensity of the corresponding pixel in the background image.

5. The method of claim 2, wherein the luminance image information is represented by a Y component of YUV image information for the video frame and the color image information is represented by a U component and a V component of YUV image information for the video frame, and wherein the step of generating a luminance difference image and a color difference image comprises:

(a)(1)(i) generating a Y difference image representing a difference between a Y component of the image information for the video frame and a Y component of the image information for the background image;

(a)(1)(ii) generating a U difference image representing a difference between a U component of the image information for the video frame and a U component of the image information for the background image; and (a)(1)(iii) generating a V difference image representing a difference between a V component of the image information for the video frame and a V component of the image information for the background image.

6. The method of claim 5, wherein the step of forming the composite image comprises steps of:

(a)(3)(i) forming a combined UV difference image from the U difference image and the V difference image; and (a)(3)(ii) combining the combined UV difference image with the Y difference image.

7. The method of claim 6, and further comprising the step of:

(a)(3)(iii) weighting the Y difference image by a predetermined emphasis factor to emphasize either color differences or intensity differences in the composite image.

8. The method of claim 5, wherein the step of generating a gray interest image comprises masking the Y component of the image information for the video frame with the binary interest image.

9. The method of claim 1, wherein the step of generating the first set of regions comprises steps of:

(a)(1) generating a luminance difference image based upon image information for the video frame and image information for the background image;

(a)(2) comparing the luminance difference image with a predetermined image difference threshold to generate a binary interest image;

(a)(3) generating a gray interest image by masking the luminance image information of the video frame with the binary interest image; and (a)(4) extracting from the gray interest image those regions that are connected and have similar gray levels.

10. The method of claim 9, and further comprising the step of:

(a)(5) adjusting values of pixels in the luminance difference image based upon values of corresponding pixels in the background image to generate an adjusted luminance difference image;

wherein the adjusted luminance difference image is compared with the predetermined image difference threshold to generate the binary interest image.

11. The method of claim 1, wherein the step of generating the first set of regions comprises steps of:

(a)(1) generating a color difference image based upon image information for the video frame and image information for the background image;

(a)(2) comparing the color difference image with a predetermined image difference threshold to generate a binary interest image;

(a)(3) generating a gray interest image by masking color image information of the video frame with the binary interest image; and (a)(4) extracting from the gray interest image those regions that are connected and have similar gray levels.

12. The method of claim 1, wherein the step of generating the third set of regions comprises steps of:

(c)(1) determining which regions in the second set can be combined with other regions to form a region pair if the region pair satisfies predetermined criteria including at least one of, a predetermined size limit, sufficient proximity of the regions in the region pair, and overlap of morphological dilated versions of the regions in the region pair; and (c)(2) comparing region pairs with each other and merging together region pairs to form groups of regions from region pairs which have a common region.

13. A system for extracting image information from a video frame for regions of the video frame that likely are objects of interest in a scene, comprising:
  (a) a video camera positioned to monitor the scene and generating video signals representing activity within the scene;
  (b) a frame grabber coupled to the video camera to generate a stream of video frames from the video signal, each video frame comprising image information of the scene at an instant of time;
  (c) a processor coupled to the frame grabber, the processor being programmed to:
    (c)(1) generate a first set of regions based upon differences between image information for the video frame and image information for a background image of the scene;
    (c)(2) generate a second set of regions from the first set of regions based upon edge information for regions in the first set and edge information for the background image by:
      (c)(2)(i) extracting edge information from each region in the first set of regions;
      (c)(2)(ii) extracting edge information for the background image;
      (c)(2)(iii) comparing edge information for each region of the first set of regions with edge information for the background image;
      (c)(2)(iv) generating a confidence value for each region in the first set of regions depending on whether pixels of a region and corresponding pixels in the background image represent edge information, wherein the processor is programmed to generate a confidence value for each region in the first set of regions by:
        examining each pixel of a region;
        if the pixel in the region represents an edge and a corresponding pixel in the background image represents an edge, then reducing the confidence value for the region;
        if the pixel in the region does not represent an edge and a corresponding pixel in the background image represents an edge, then increasing the confidence value for the region; and
        if the pixel in the region represents an edge and a corresponding pixel in the background image does not represent an edge, then increasing the confidence value for the region; and
      (c)(2)(v) retaining regions from the first set of regions which have a confidence value greater than a predetermined confidence threshold; and
    (c)(3) generate a third set of regions from the second set of regions by combining regions in the second set with each other if resulting combined regions satisfy predetermined criteria.

14. The system of claim 13, wherein the processor is programmed to generate the first set of regions by:
  (c)(1)(i) generating a luminance difference image and a color difference image based upon image information for the video frame and image information for the background image;
  (c)(1)(ii) forming a composite image from the luminance difference image and the color difference image;
  (c)(1)(iii) comparing the composite image with a predetermined image difference threshold to generate a binary interest image;
  (c)(1)(iv) generating a gray interest image by masking the luminance image information for the video frame with the binary interest image; and
  (c)(1)(v) extracting from the gray interest image those regions that are connected and have similar gray levels.

15. The system of claim 14, wherein the processor is further programmed to perform the step of:
  (c)(1)(ii) adjusting values of pixels in the luminance difference image based upon values of corresponding pixels in the background image to generate an adjusted luminance difference image;
  wherein the composite image is formed based on the adjusted luminance difference image and the color difference image.

16. The system of claim 15, wherein the processor is further programmed to adjust values of pixels in the luminance difference image comprises multiplying a value of each pixel in the luminance difference image by a factor which is proportional to a luminance intensity of the corresponding pixel in the background image.

17. The system of claim 14, wherein the video camera generates a color video signal comprising luminance image information and color image information, the luminance image information represented by a Y component of YUV image information and the color image information comprises a U component and a V component of the YUV image information, wherein the processor is programmed to generate the luminance difference image and the color difference image by:
  (c)(1)(i)(A) generating a Y difference image representing a difference between a Y component of the image information for the video frame and a Y component of the image information for the background image;
  (c)(1)(i)(B) generating a U difference image representing a difference between a U component of the image information for the video frame and a U component of the image information for the background image; and
  (c)(1)(i)(C) generating a V difference image representing a difference between a V component of the image information for the video frame and a V component of the image information for the background image.

18. The system of claim 17, wherein the processor is programmed to form the composite image by:
  (c)(1)(iii)(A) forming a combined UV difference image from the U difference image and the V difference image; and
  (c)(1)(iii)(B) combining the combined UV difference image with the Y difference image.

19. The system of claim 18, wherein the processor is further programmed to form the composite image by:
  (c)(1)(iii)(C) weighting the Y difference image by a predetermined emphasis factor to emphasize either color differences or intensity differences in the composite image.

20. The system of claim 17, wherein the processor is programmed to generate a gray interest image by masking the Y component of the image information for the video frame with the binary interest image.

21. The system of claim 13, wherein the processor is programmed to generate the first set of regions by:
  (c)(1)(i) generating a luminance difference image based upon image information for the video frame and image information for the background image;
  (c)(1)(ii) comparing the luminance difference image with a predetermined image difference threshold to generate a binary interest image;
  (c)(1)(iii) generating a gray interest image by masking the luminance image information of the video frame with the binary interest image; and (c)(1)(iv) extracting from the gray interest image those regions that are connected and have similar gray levels to form the initial region set.

22. The system of claim 21, wherein the processor is further programmed to adjust the luminance difference image by:
- (c)(1)(v) adjusting values of pixels in the luminance difference image based upon values of corresponding pixels in the background image to generate an adjusted luminance difference image; wherein the adjusted luminance difference image is compared with the predetermined image difference threshold to generate the binary interest image.

23. The system of claim 13, wherein the processor is programmed to generate the first set of regions by:
- (c)(1)(i) generating a luminance difference image based upon image information for the video frame and image information for the background image;
- (c)(1)(ii) comparing the luminance difference image with a predetermined image difference threshold to generate a binary interest image;
- (c)(1)(iii) generating a gray interest image by masking the luminance image information of the video frame with the binary interest image; and
- (c)(1)(iv) extracting from the gray interest image those regions that are connected and have similar gray levels.

24. The system of claim 23, wherein the processor is further programmed to:
- (c)(1)(v) adjust values of pixels in the luminance difference image based upon values of corresponding pixels in the background image to generate an adjusted luminance difference image;
wherein the adjusted luminance difference image is compared with the predetermined image difference threshold to generate the binary interest image.

25. The system of claim 13, wherein the processor is programmed to generate the first set of regions by:
- (c)(1)(i) generating a color difference image based upon image information for the video frame and image information for the background image;
- (c)(1)(ii) comparing the color difference image with a predetermined image difference threshold to generate a binary interest image;
- (c)(1)(iii) generating a gray interest image by masking the color image information of the video frame with the binary interest image; and
- (c)(1)(iv) extracting from the gray interest image those regions that are connected and have similar gray levels.

26. The system of claim 13, wherein the processor is programmed to generate the third set of regions by:
- (c)(3)(i) determining which regions in the second set can be combined with other regions to form a region pair if the region pair satisfies predetermined criteria including at least one of, a predetermined size limit, sufficient proximity of the regions, and overlap of morphological dilated versions of the regions; and
- (c)(3)(ii) comparing region pairs with each other and merging together region pairs to form groups of regions from regions pairs which have a common region.

27. A computer-readable medium storing executable instructions which cause a computer to extract image information from a video frame for regions of the video frame that likely are objects of interest in the scene, by:
- (a) generating a first set of regions based upon differences between image information for the video frame and image information for a background image of the scene;
- (b) generating a second set of regions from the first set of regions based upon edge information for regions in the first set and edge information for the background image and generating a second set of regions, wherein the step of generating the second set of regions comprises steps of
  - (b)(1) extracting edge information from each region in the first set of regions;
  - (b)(2) extracting edge information for the background image;
  - (b)(3) comparing edge information for each region of the first set of regions with edge information for the background image;
  - (b)(4) generating a confidence value for each region in the first set of regions depending on whether pixels of a region and corresponding pixels in the background image represent edge information, wherein the instructions for generating a confidence value for each region in the first set comprise instructions for:
    examining each pixel of a region;
    if the pixel in the region represents an edge and a corresponding pixel in the background image represents an edge, then reducing the confidence value for the region;
    if the pixel in the region does not represent an edge and a corresponding pixel in the background image represents an edge, then increasing the confidence value for the region; and
    if the pixel in the region represents an edge and a corresponding pixel in the background image does not represent an edge, then increasing the confidence value for the region;
  - (b)(5) retaining regions from the first set of regions which have a confidence value greater than a predetermined confidence threshold; and
- (c) generating a third set of regions from the second set of regions by combining regions in the second set with each other if resulting combined regions satisfy predetermined criteria.

28. The computer-readable medium of claim 27, wherein the executable instructions for generating the first set of regions comprise instructions for:
- (a)(1) generating a luminance difference image and a color difference image based upon image information for the video frame and image information for the background image;
- (a)(2) forming a composite image from the luminance difference image and the color difference image;
- (a)(3) comparing the composite image with a predetermined image difference threshold to generate a binary interest image;
- (a)(4) generating a gray interest image by masking the luminance image information for the video frame with the binary interest image; and
- (a)(5) extracting from the gray interest image those regions that are connected and have similar gray levels.

29. The computer-readable medium of claim 28, and further comprising instructions for:
- (a)(6) adjusting values of pixels in the luminance difference image based upon values of corresponding pixels in the background image to generate an adjusted luminance difference image;
wherein the composite image is formed based on the adjusted luminance difference image and the color difference image.

30. The computer-readable medium of claim 9, wherein the instructions for adjusting the pixels in the luminance difference image comprise instructions for multiplying a value of each pixel in the luminance difference image by a factor which is proportional to a luminance intensity of the corresponding pixel in the background image.

31. The computer-readable medium of claim 28, wherein the luminance image information comprises a Y component of YUV image information for the video frame and the color image information is represented by a U component and a V component of YUV image information for the video frame, and wherein the instructions for generating a luminance difference image and a color difference image comprise instructions for:

(a)(1)(i) generating a Y difference image representing a difference between a Y component of the image information for the video frame and a Y component of the image information for the background image;

(a)(1)(ii) generating a U difference image representing a difference between a U component of the image information for the video frame and a U component of the image information for the background image; and (a)(1)(iii) generating a V difference image representing a difference between a V component of the image information for the video frame and a V component of the image information for the background image.

32. The computer-readable medium of claim 31, wherein the instructions for forming a composite image comprise instructions for:

(a)(3)(i) forming a combined UV difference image from the U difference image and the V difference image; and (a)(3)(ii) combining the combined UV difference image with the Y difference image.

33. The computer-readable medium of claim 32, wherein the instructions for forming the composite image further comprise instructions for:

(a)(3)(iii) weighting the Y difference image by a predetermined emphasis factor to emphasize either color differences or intensity differences in the composite image.

34. The computer-readable medium of claim 32, wherein the instructions for generating a gray interest image comprise masking the Y component of the image information for the video frame with the binary interest image.

35. The computer-readable medium of claim 27, wherein the instructions for generating the first set of regions comprise instructions for:

(a)(1) generating a luminance difference image based upon image information for the video frame and image information for the background image;

(a)(2) comparing the luminance difference image with a predetermined image difference threshold to generate a binary interest image;

(a)(3) generating a gray interest image by masking the luminance image information of the video frame with the binary interest image; and (a)(4) extracting from the gray interest image those regions that are connected and have similar gray levels to form the initial region set.

36. The computer-readable medium of claim 35, and further comprising instructions for:

adjusting values of pixels in the luminance difference image based upon values of corresponding pixels in the background image to generate an adjusted luminance difference image;

wherein the adjusted luminance difference image is compared with the predetermined image difference threshold to generate the binary interest image.

37. The computer-readable medium of claim 27, wherein the instructions for generate the first set of regions comprise instructions for:

(a)(1) generating a color difference image based upon image information for the video frame and image information for the background image;

(a)(2) comparing the color difference image with a predetermined image difference threshold to generate a binary interest image;

(a)(3) generating a gray interest image by masking color image information of the video frame with the binary interest image; and (a)(4) extracting from the gray interest image those regions that are connected and have similar gray levels.

38. The computer-readable medium of claim 27, wherein the instructions for generating the third set of regions comprise instructions for:

(c)(1) determining which regions in the second set can be combined with other regions to form a region pair if the region pair satisfies predetermined criteria including at least one of, a predetermined size limit, sufficient proximity of the regions, and overlap of morphological dilated versions of the regions; and (c)(2) comparing region pairs with each other and merging together region pairs to form groups or regions from region pairs which have a common region.

* * * * *